J. B. Thomas,
Bench Plane.
No. 14,423. Fig. C. Patented Mar. 11, 1856.
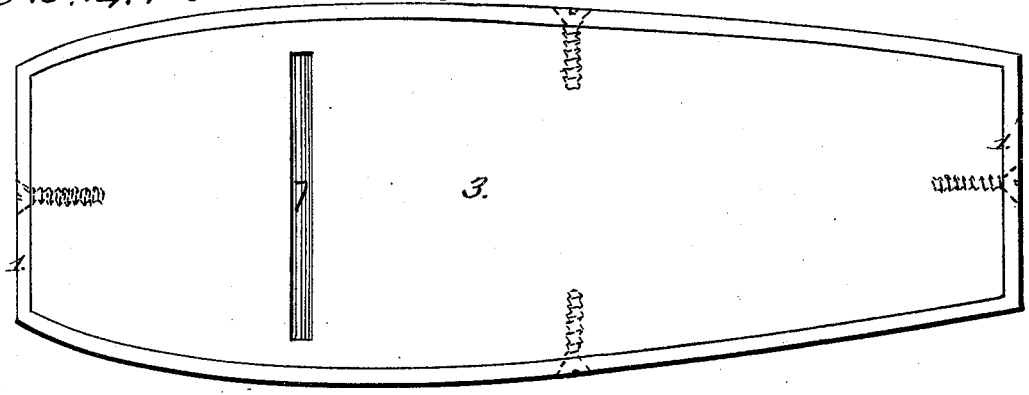
Fig. A.
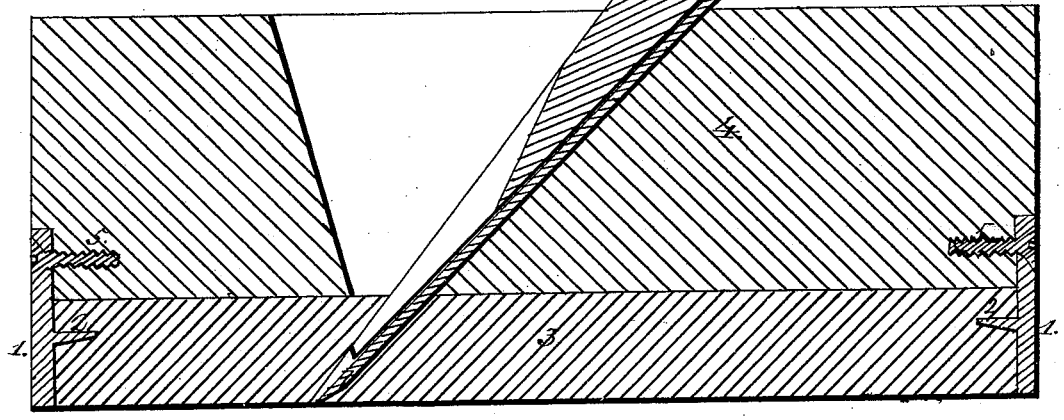
Fig. B.
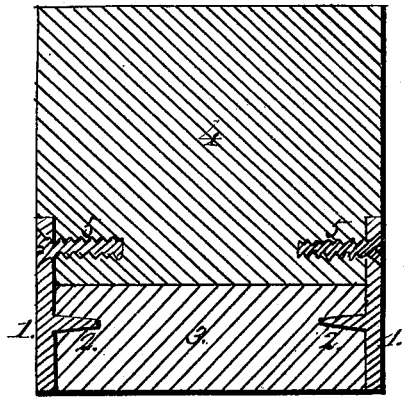

UNITED STATES PATENT OFFICE.

JNO. B. THOMAS, OF CINCINNATI, OHIO.

PLANE-STOCK.

Specification of Letters Patent No. 14,423, dated March 11, 1856.

*To all whom it may concern:*

Be it known that I, JOHN B. THOMAS, of the city of Cincinnati, in the county of Hamilton and State of Ohio, have invented a new and useful Improvement in Facing Planes with Glass for Planing Wood; and I do hereby declare that the following is a full and exact description thereof, reference being had to the accompanying drawings, forming part of this specification, and to the letters and figures of reference marked thereon.

Similar letters and figures refer to corresponding parts of the improvement.

The nature of my improvement consists in the means employed for protecting the corners of the glass facing to the plane, by inclosing it within a metal band or case, and holding the glass to the stock of the plane used for carrying the bit.

The improvement is applicable to every description of planes.

To enable others skilled in the art to make and use my improvement I will proceed to describe its construction and operation by referring direct to the accompanying drawings.

Figure A, represents a longitudinal sectional view of the improved plane. Fig. B, is a transverse sectional view of the plane. Fig. C, is a face view of the plane, showing the manner of inclosing the glass face with some metallic substance.

1, represents a case or ferrule into which the glass face 3 is poured, while in a fused or melted state. The lower part of the ferrule is made perfectly true, and placed on a plane or true surface, and the glass face 3, is then poured into it, an opening having been formed by means of a core, or other equivalent, through the glass, for the bit to pass through to the face of the plane, as represented in Fig. A. The glass is held to its place by means of projecting pins or flanges 2, cast or otherwise attached to the inside of the case 1, as represented in Figs. A, and B, thus preventing the glass face from coming out of the case or ferrule, or getting loose.

The stock 4, or upper portion of the plane is made of wood, and employed for carrying the bit 7, and wedge 6, and is connected to the glass face by means of screws 5, passing through the case or ferrule 1, at the ends and sides, as shown in the different drawings, thus firmly uniting the face and stock of the plane, and giving as perfect command over the bit as is had in the ordinary construction of planes.

The glass face will be made from $\frac{1}{2}$ to $\frac{3}{4}$ of an inch thick, more or less, according to the size and use to which the plane is applied, and the case or ferrule will be made sufficiently wide to firmly unite the stock 4, and face together.

The great advantage arising from the use of a glass face, is in its durability and smoothness, and the plane never becoming untrue on its face or becoming scratched by using the plane on the hardest kinds of woods. The dotted screws represented in Fig. C, extend into the stock 4, of the wood portion of the plane as before mentioned.

Another advantage from the use of my improved plane is the lessening of friction compared with those at present constructed, owing to the smooth surface the glass face will always retain.

What I claim as my improvement and desire to secure by Letters Patent, is—

The glass face 3, combined with the case or ferrule 1, or its equivalent, all substantially as, and for the purposes set forth in the foregoing specifications.

JOHN B. THOMAS.

Witnesses:
L. W. SMITH,
JOSEPH R. DICKEY.